D. A. CORRIE.
SPINDLE LUBRICATOR.
APPLICATION FILED MAR. 16, 1912.
1,065,781.
Patented June 24, 1913.
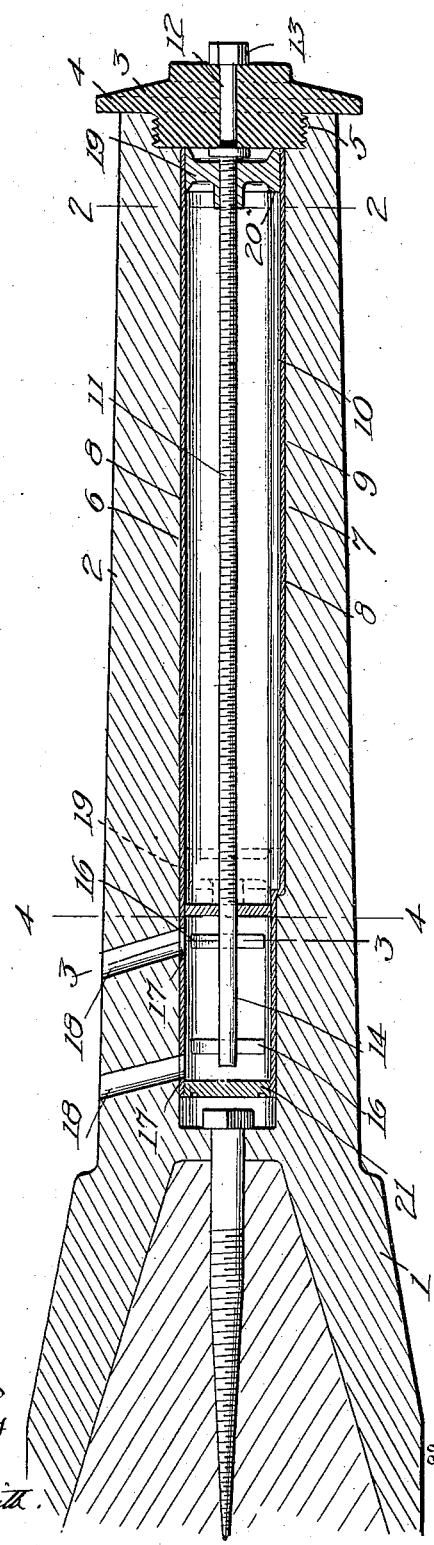
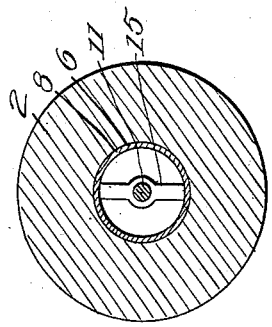
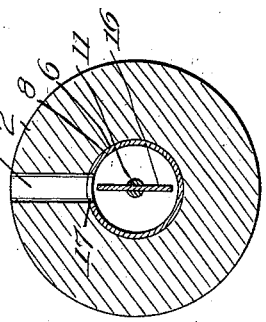
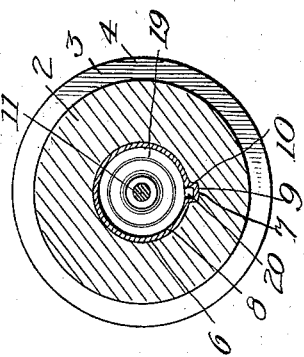
Inventor
David A. Corrie
Witnesses
By Victor J. Evans
Attorney

UNITED STATES PATENT OFFICE.

DAVID A. CORRIE, OF VINCENNES, INDIANA.

SPINDLE-LUBRICATOR.

1,065,781.  Specification of Letters Patent. Patented June 24, 1913.

Application filed March 16, 1912. Serial No. 684,212.

*To all whom it may concern:*

Be it known that I, DAVID A. CORRIE, a citizen of the United States, residing at Vincennes, in the county of Knox and State of Indiana, have invented new and useful Improvements in Spindle-Lubricators, of which the following is a specification.

This invention relates to lubricators for spindles, shafts, axles, and the like, the object in view being to provide a convenient lubricating device separable from the spindle and axle, and adapted to be filled with grease or other lubricating material, and restored to place in an easy and expeditious manner.

The lubricating device embodies means for intermittently forcing the grease or other lubricant to the surface of the spindle or journal, rendering it necessary only to remove the grease tube of the lubricator at infrequent intervals for the purpose of refilling the same.

With the above and other objects in view, the invention consists in the novel construction, combination and arrangement of parts, hereinafter fully described, illustrated and claimed.

In the accompanying drawings, Figure 1 is a longitudinal section through the axle spindle showing the lubricating device applied thereto. Fig. 2 is a vertical cross section through the same on the line 2—2 of Fig. 1. Fig. 3 is a cross section on the line 3—3 of Fig. 1. Fig. 4 is a cross section on the line 4—4 of Fig. 1.

Referring to the drawings, 1 designates an axle, 2 the spindle and 3 the usual cap nut for retaining the hub of the wheel on the spindle, said nut being provided with a wheel retaining flange 4 and being threaded into a recess 5 in the end of the spindle, the construction thus far described being the usual construction employed.

In carrying out the present invention, the spindle 2 is provided with a central longitudinal bore 6 having an offset groove or extension 7 extending lengthwise thereof to receive a corresponding offset in a grease tube 8, which is removably inserted in the bore 6 at the open end of the spindle when the nut 3 is removed. The grease tube 8 is adapted to slide easily into the bore of the spindle and is offset at one side, as shown at 9, to form a longitudinal keyway 10, the purpose of which will hereinafter appear.

Extending centrally and longitudinally of the grease tube is a feed screw 11, the outer end of which passes through the nut and is journaled therein, as shown at 12, the outer end of said feed screw being provided with a head 13, adapting the feed screw to be turned with the aid of the wrench, pliers or similar implements. The inner portion of the feed screw 11 is left smooth or threadless, as shown at 14, and is journaled in a cross bar 15, and also carries one or more stirring elements 16, fast on the feed screw, and arranged adjacent to ports or vents 17 formed in the grease tube and which register with corresponding vents or ports 18 in the spindle 2. The ports 18 open out at the top of the spindle, as shown in Fig. 1, so as to supply the grease to the outer surface and highest point thereof.

Mounted within the grease tube 6 is a piston or follower 19, which is threaded on the screw 11, and provided with a key or tongue 20, adapted to move lengthwise of the keyway 10, and thereby prevent said piston or follower from rotating. Thus as the feed screw 11 is revolved the piston or follower 19 is caused to move lengthwise of the feed screw for the purpose of expelling the grease or other lubricant through the lateral vents in the spindle.

At its inner end the grease tube is closed by means of a removable plug or cap 21, which enables the tube to be filled with grease, after it has been removed from the spindle. This may be accomplished by removing the nut 3 without the necessity of removing the wheel journaled on the spindle.

Whenever there is any indication of lack of proper lubrication of the spindle, it is only necessary to give a few turns to the feed screw 11, by applying a suitable instrument to the head 13, thereby forcing the desired quantity of grease or lubricant through the vents, as previously stated. Only once in a great while is it necessary to remove the grease tube for the purpose of refilling the same.

I claim:

An axle spindle having a central longitudinal bore, a detachable grease tube inserted with a sliding fit into the outer end of the spindle and provided with a longitudinal keyway and a lateral vent for the grease, a detachable plug closing the inner end of the grease tube, a nut threaded into the outer end of said bore and serving to hold the grease tube in place, a feed screw journaled in the grease tube and in the nut and adapted to be turned from the outside of the nut, said feed screw being longitudinally immovable with relation to the grease tube while in its operative position but detachable together with said tube, a piston movable within and lengthwise of the grease tube, said piston being threaded upon and actuated by the feed screw and having a key working in said keyway, and a grease stirring element fast on the feed screw adjacent to the lateral vent in the grease tube.

In testimony whereof I affix my signature in presence of two witnesses.

DAVID A. CORRIE.

Witnesses:
WILLIAM S. COLEMAN,
WILLIAM M. VAN METRE.

Copies of this patent may be obtained for five cents each, by addressing the "Commissioner of Patents, Washington, D. C."